July 2, 1968     D. L. BURROWS     3,390,516
COLLAPSIBLE RAKE
Filed Dec. 9, 1965
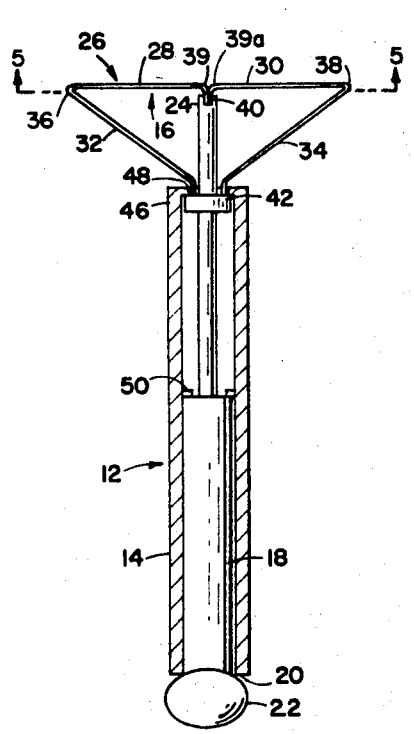
FIG. 1
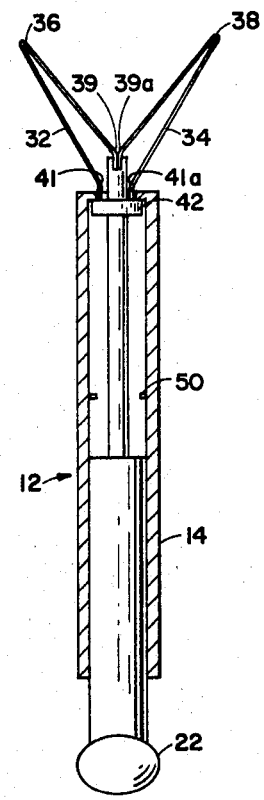
FIG. 2
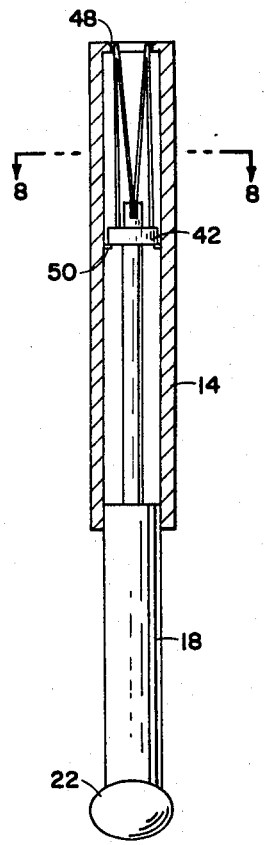
FIG. 3
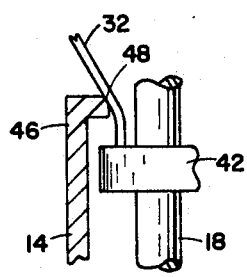
FIG. 4
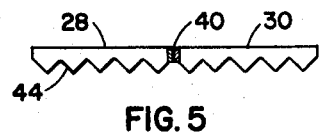
FIG. 5
FIG. 6
FIG. 7
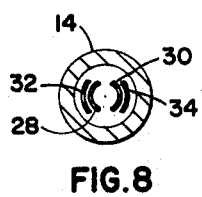
FIG. 8
Dale L. Burrows,
*INVENTOR.*
BY
*Charles A. Phillips*
ATTORNEY.

United States Patent Office 3,390,516
Patented July 2, 1968

3,390,516
COLLAPSIBLE RAKE
Dale L. Burrows, 1707 Club View Drive NW.,
Huntsville, Ala. 35805
Filed Dec. 9, 1965, Ser. No. 512,622
8 Claims. (Cl. 56—400.19)

This invention relates to hand rakes and particularly to a collapsible hand rake.

While a variety of rakes have been developed which incorporate quick disassembly features and a measure of collapsibility, it is believed that none of the existing rakes adequately provide the features of being quickly convertable from a useful rake into a safely and conveniently transportable package.

There are many applications where the need for a truly portable rake exists, one example being in the field of golf where a rake is needed which can be carried by golfers as they play and be available at the instant of need to smooth sand traps and remove debris from their path of play.

It is accordingly an object of this invention to provide a novel collapsible rake which when in an operative position is an efficient and effective rake and when collapsed it is easily, safely and conveniently handled and stored for carriage without special care or precaution.

Another object of this invention is to provide a collapsible or folding rake which may be changed from an operative to a collapsible or storable mode quickly and without tools or special skills.

The foregoing and other objects of the present invention will become more readily apparent from the following description when considered in conjunction with the following drawings in which:

FIG. 1 is a partially sectional view showing the rake in extended position for use;

FIG. 2 is an elevational view showing the rake being retracted into its handle for storage in a golf bag;

FIG. 3 is a view of the assembly, partially in section, illustrating the rake in its retracted position;

FIG. 4 is a fragmentary sectional view showing the relationship of a collar and housing when the rake is in an extended position;

FIG. 5 is an elevational view of the rake head;

FIGS. 6 and 7 are sectional views showing certain construction details of the rake head; and FIG. 8 is a sectional view of a portion of FIG. 3.

Referring now to the drawings and particularly to FIG. 1, there is illustrated a collapsible rake generally illustrated by the numeral 12 and which is shown to include an elongated circular housing or handle 14 and rake assembly 16.

Rake assembly 16 includes a shaft 18 somewhat longer than said housing and having at one end 20, a knob 22 and at the other end 24 a foldable rake head assembly 26. Foldable rake head assembly 26 consists of rake or tine members 28 and 30, supporting arm members 32 and 34 and hinging sections 36 and 38 which interconnect and achieve folding between the rake members and supporting arm members. One end of each of the rake members 28 and 30 is pivotably affixed by hinging sections 39 and 39a to end 24 of shaft 18 and secured as by adhesive compounds in groove 40 or members 28 and 30 may be made integrally with shaft 18. The otherwise free ends of arm members 32 and 34 are pivotably attached by hinging sections 41 and 41a to sleeve collar 42 which encompasses, and is slidably mounted on, shaft 18 and which has an outer contour conforming with the interior of housing 14 to provide a bushing between shaft 18 and housing 14. Rake head assembly 26, including hinging sections, may be made entirely of yieldable plastic material such as polyethylene and relies on the low fatigue property of this material to provide necessary durability in bending. Mechanical hinges, as an alternate method of construction, may be provided at 36, 38, 39, 39a, 41 and 41a.

Rake members 28 and 30 and arm members 32 and 34 conform substantially in cross-section to a segment of a circle to provide inherent bracing as shown in FIGS. 5 and 6 in order to make rake assembly 26 sufficiently rigid. This construction also facilitates nesting of elements within circular housing 14 as shown in FIG. 8. Rake or tine members 28 and 30 are shown in detail in FIG. 5 and include a plurality of tines 44 for effective smoothing and raking of sand and turf as well as for the common chore of raking leaves. The backward curvature of the rake members provides more a desired brushing action than a digging action. To support arm members 32 and 34 in their extended position, housing 14 (FIG. 4), is provided at its forward end 46 with an inwardly protruding shoulder 48 against which collar 42 will abut when rake head assembly 26 is extended. The extended position travel of shaft 18 is arrested by tab, locking ring or stop 50 or knob 22.

As shown in FIGS. 1–3, the lower portion of shaft 18 is enlarged to mate with the interior size and contour of housing 14 to provide a bushing with the interior of housing 14.

In operation from the retracted to the open position, knob or handle 22, and thus shaft 18, is moved inward at one end of housing 14 to extend rake head assembly 26 outward of the other end of housing 14. Further inward movement of knob 22 and shaft 18 causes collar 42 to engage shoulder 48 and retain the collar in the position shown in FIG. 2 at end 46 of housing 14. With a slight additional inward movement of knob 22, shaft 18 is caused to swing rake head assembly 26 outwardly around pivoted connection occurring where the ends of rake members 28 and 30 are affixed to end 24 of shaft 18 to produce the extended and working position shown in FIG. 1 wherein rake members 28 and 30 are in-line and perpendicular to shaft 18.

The length of each rake member, the length of each supporting arm member and the distance of travel of collar and shaft share a peculiar geometric relationship such that the two sections of the rake become co-linear when the rake is extended for use.

Shaft 18 is locked, in so far as further extension is concerned, by knob 22 engaging end 20 of housing 14 and shaft 18 is frictionally restrained from movement in the reverse direction by frictional engagement with housing 14. Rake head members 28 and 30 are thus retained in operative position by arm members 32 and 34 which are held in engagement with the periphery of shoulder 48.

To retract rake head assembly 26 into the housing, it is only necessary to pull knob 22 outward. This causes the inner ends of the rake members to commence folding the rake assembly and collar 42 to be drawn toward the center of housing 14. A locking ring or tab 50 provides a stop for limit of travel for head assembly 26 in the retracted position. The frictional fit between shaft 18 and housing 14 prevents unintentional extracting and unfolding of rake assembly 26. Rake head 28 and 30 then complete the folding cycle to nest within supporting arms 32 and 34 and the rake assembly is totally drawn into housing 14. Once drawn in, the rake assembly is stored within housing 14 until needed again, at which time it is just as quickly withdrawn and unfolded. The dynamics of motion connected with the opening and retracting operations peculiarly facilitates the ease and certainty of operation by the use of fast manipulation. During a fast opening, the rake members tend to stay in a nested position until bushing 42 hits shoulder 48 thus avoiding lateral jamming against shoulder 48. During a fast retraction, bushing 42 tends to remain abutted against shoulder 48 until the rake members have come to a nested position thus avoiding lateral jamming against shoulder 48.

It can be seen from the foregoing description that a compact, durable raking device has been provided which is particularly useful for smoothing sand traps and for light raking chores in general. It is quite portable and readily adjustable from operative position to a neat compact arrangement wherein the tines of the rake are conveniently and efficiently sheathed in the handle of the rake for storage, e.g., in a golf bag.

It will be understood that many modifications may be made within the scope of the appended claims and without departing from the spirit and scope of appended claims. For example although head assembly 26 is shown to be made of a plastic type material, other materials such as metal may be employed instead. Similarly the choice of materials for the construction of housing 14 and shaft 18 is not critical and would include wood, metal or a plastic material.

I claim:
1. A collapsible rake comprising:
   (a) an elongated housing being open at both ends;
   (b) a shaft longer than said housing and extending through said housing and wherein:
      (1) said shaft has an enlarged portion corresponding to the interior contour of said housing extending from one end of said shaft a distance along said shaft, and
      (2) said enlarged portion of said shaft being adapted to provide a bushing for movement of said shaft with respect to said housing;
   (c) a collar slideably mounted on said shaft and positionable between the other end of said shaft and said enlarged portion of said shaft and said collar having an outer contour conforming to the interior of said housing and providing a second bushing between said shaft and said housing;
   (d) a foldable rake head assembly adapted to be drawn into and withdrawn from one end of said housing and comprising:
      (1) first and second rake members,
      (2) first and second supporting arm members,
      (3) a first end of each of said rake members being pivotably connected to the said other end of said shaft,
      (4) said first supporting arm member being pivotably connected at its ends to said first rake member and said collar, and
      (5) said second supporting arm member being pivotably connected at its ends to said second rake member and said collar.

2. The collapsible rake set forth in claim 1 wherein said housing further comprises an inwardly protruding portion at said one end of said housing and said inwardly protruding portion being adapted to prevent said collar from moving out of said housing.

3. The collapsible rake set forth in claim 2 further comprising means cooperatively acting between said shaft and said housing for limiting the travel of said shaft out of said one end of said housing to a distance substantially the length of a said rake member, wherein said rake members are supported in an in-line position.

4. The collapsible rake set forth in claim 3 further comprising means for limiting the travel of said collar into said housing to substantially a distance equal to the length of a said supporting arm member.

5. The collapsible rake set forth in claim 4 wherein pivotal ends of said rake members and said arm members are each hinged by hinge means comprising yieldable plastic material.

6. The collapsible rake set forth in claim 5 wherein rake members and said arm members are constructed of the same material as said hinge means.

7. The collapsible rake set forth in claim 6 wherein said means for limiting the travel of said shaft out of said housing comprises an inwardly protruding member on the interior surface of said housing and positioned a distance from said one end of said housing substantially equal to the length of a said rake member.

8. The collapsible rake set forth in claim 6 wherein said rake members and said supporting members substantially comprise in cross-section a segment of a circle.

References Cited

UNITED STATES PATENTS

| | | | |
|---|---|---|---|
| 987,008 | 3/1911 | McKibbin | 56—400.19 X |
| 1,272,567 | 7/1918 | Swan | 56—400.19 X |
| 2,086,170 | 7/1937 | Muranaka | 56—400.19 X |

HUGH R. CHAMBLEE, *Primary Examiner.*